United States Patent
Perruchot

(10) Patent No.: US 11,050,953 B2
(45) Date of Patent: Jun. 29, 2021

(54) INFRARED IMAGER

(71) Applicant: THALES, Courbevoie (FR)

(72) Inventor: Ludovic Perruchot, Élancourt (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/646,909

(22) PCT Filed: Sep. 18, 2018

(86) PCT No.: PCT/EP2018/075247
§ 371 (c)(1),
(2) Date: Mar. 12, 2020

(87) PCT Pub. No.: WO2019/053294
PCT Pub. Date: Mar. 21, 2019

(65) Prior Publication Data
US 2020/0304730 A1    Sep. 24, 2020

(30) Foreign Application Priority Data

Sep. 18, 2017    (FR) ..................................... 17 00941

(51) Int. Cl.
*H04N 5/33*    (2006.01)
(52) U.S. Cl.
CPC ..................................... *H04N 5/33* (2013.01)
(58) Field of Classification Search
CPC .......................................................... H04N 5/33
(Continued)

(56) References Cited

U.S. PATENT DOCUMENTS

2007/0170363 A1 * 7/2007 Schimert ................. G01J 5/024
250/353
2009/0303456 A1 * 12/2009 Paiva ....................... G01S 17/87
356/3
(Continued)

FOREIGN PATENT DOCUMENTS

EP    0 289 306 A2    11/1988
EP    0 289 306 A3    11/1988
(Continued)

OTHER PUBLICATIONS

French Search Report, from the French Patent Office in counterpart French Application No. 1700941, dated Mar. 19, 2018.
(Continued)

*Primary Examiner* — Thai Q Tran
*Assistant Examiner* — Stephen R Smith
(74) *Attorney, Agent, or Firm* — Arent Fox LLP

(57) ABSTRACT

The present invention relates to an infrared imager suitable for detecting an infrared flux in a first and a second spectral band, the imager comprising an enclosure and comprising:
  a separator separating an incident infrared flux into two fluxes,
  a single detector suitable for detecting a flux in the two spectral bands, the detector being cooled to a temperature lower than the temperature of the enclosure,
  a switching optic movable between a first position in which the first flux is sent to the detector and a second position in which the second flux is sent to the detector, and
  a reflector having a bottom positioned in order that the image of the bottom in the first spectral band by the switching optic in the second position is situated on detector.

11 Claims, 6 Drawing Sheets

Figure 1:
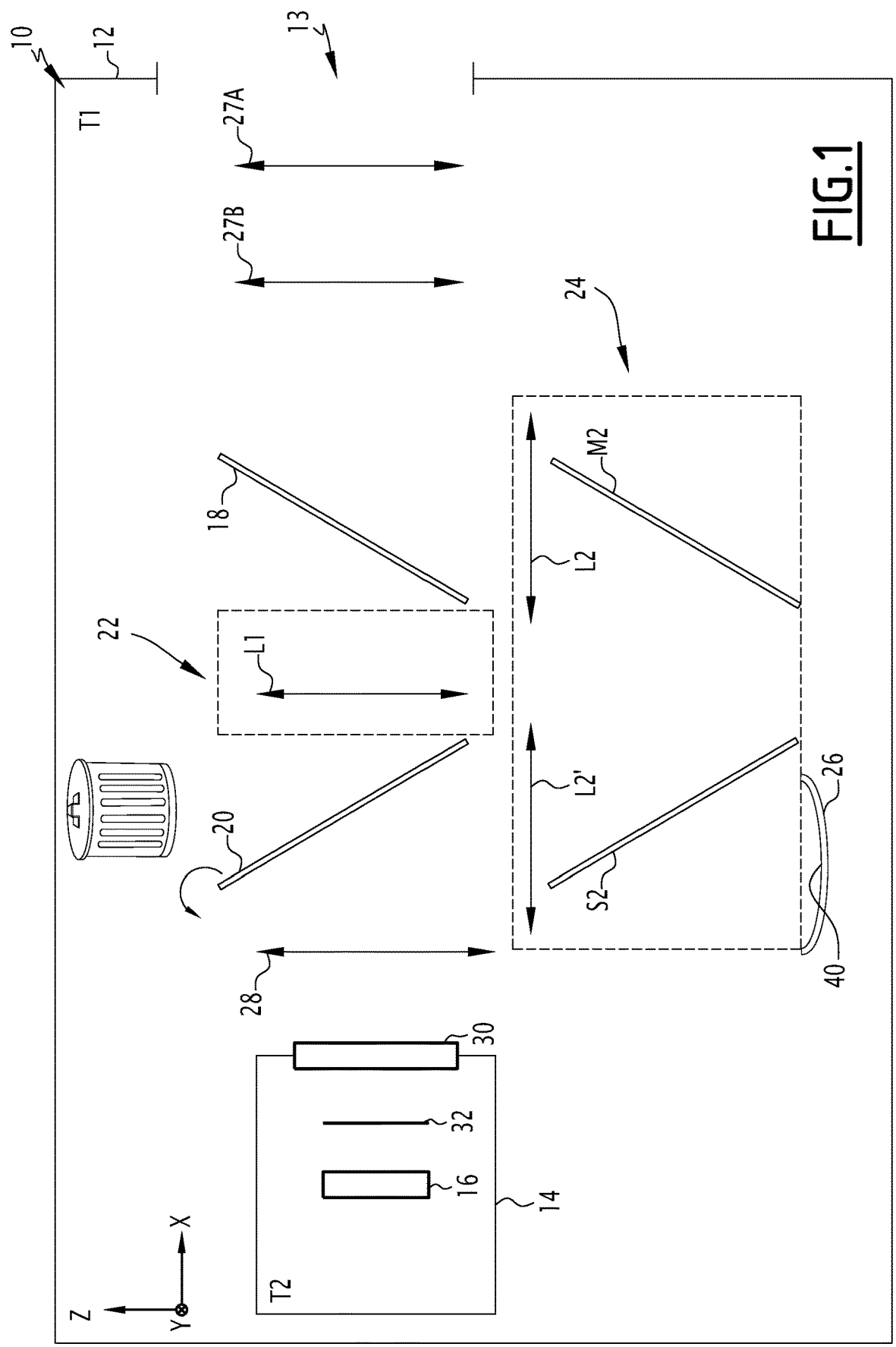

(58) Field of Classification Search
USPC .................. 250/338.1, 353; 348/162, 164, 49
See application file for complete search history.

(56) References Cited

U.S. PATENT DOCUMENTS

| | | | |
|---|---|---|---|
| 2011/0315878 A1* | 12/2011 | Vizgaitis | ............ G02B 17/0832 |
| | | | 250/332 |
| 2012/0007979 A1* | 1/2012 | Schneider | ............ G06K 9/0063 |
| | | | 348/116 |
| 2016/0103000 A1* | 4/2016 | Fest | ......................... G01D 5/30 |
| | | | 250/332 |
| 2017/0374297 A1* | 12/2017 | Jhabvala | ................ G02B 5/208 |
| 2018/0041727 A1* | 2/2018 | Lund | .................... H04N 5/3454 |

FOREIGN PATENT DOCUMENTS

| | | | |
|---|---|---|---|
| FR | 2 950 763 A1 | 4/2011 | |
| FR | 3014194 A1 * | 6/2015 | ............ G01J 5/0862 |
| FR | 3 014 194 A1 | 8/2015 | |
| WO | WO 2017/097857 A1 | 6/2017 | |

OTHER PUBLICATIONS

International Search Report and Written Opinion, issued by International Searching Authority in corresponding International Application No. PCT/EP2018/075247, dated Oct. 24, 2018.
Wood, R. A., "Low-Cost Infrared Imagers", Honeywell Technology Center, Scientific Honeyweller, XP000678076, pp. 109-116, (1996).

* cited by examiner

INFRARED IMAGER

CROSS-REFERENCE TO RELATED APPLICATIONS

This application is a National Stage Entry of International Patent Application No. PCT/EP2018/075247, filed on Sep. 18, 2018, which claims priority to French Application No. 17 00941, filed on Sep. 18, 2017. The disclosures of the priority applications are incorporated in their entirety herein by reference.

The present invention relates to an infrared imager. The present invention also relates to an optronic system comprising such an imager. The present invention also relates to a platform comprising such an optronic system.

In the optronic field, it is known to equip optronic systems with infrared imagers working in specific spectral bands. The spectral bands of such imagers are, for example, chosen as a function of the type of optronic systems or the environment in which the optronic systems are located. For example, for long-range optronic systems or those evolving in wet climates, the spectral band comprising the wavelength range between 3 micrometers (µm) and 5 µm, called "band II", is preferred. Conversely, for short-range optronic systems or those evolving in cold climates, the spectral band comprising the wavelength range between 8 µm and 12 µm, called "band III", is preferred. Indeed, band III emits more photons at ambient temperature than band II. Conversely, band II has a better atmospheric transmission than spectral band III.

In other applications, the spectral band comprising the range of wavelengths between 1 µm and 2 µm, called "band I", is preferred, such a band having the advantage of limiting the diffraction.

For some applications, it is known to use systems working in two separate spectral bands.

However, such systems are expensive, resource-heavy and bulky.

There is therefore a need for a system able to operate in at least two separate spectral bands, which consumes fewer resources and is less bulky.

To that end, the invention relates to an infrared imager suitable for detecting an infrared flux in a first and a second spectral band, the first band and the second band being continuous and noncontiguous with one another, the imager comprising an enclosure, the enclosure having a first temperature, the enclosure comprising:
- a separator separating an incident infrared flux into two separate fluxes, the first flux being the portion of the incident infrared flux in the first spectral band and the second flux being the portion of the incident infrared flux in the second spectral band,
- a single detector able to detect a flux in both spectral bands, the detector being cooled to a second temperature, the second temperature being strictly lower than the first temperature,
- a switching optic movable between a first position in which the first flux is sent to the detector and a second position in which the second flux is sent to the detector, and
- a first reflector having a first bottom at a temperature strictly below the first temperature, the first reflector being positioned so that the image of the first bottom in the first spectral band by the switching optic in the second position is situated on the detector.

According to specific embodiments, the imager comprises one or more of the following features, considered alone or according to any technically possible combinations:
- the detector is made from a material chosen from among Mercury Cadmium Telluride, Indium-Gallium Arsenide and Indium Antimonide.
- the imager comprises a second reflector having a second bottom at a temperature strictly below the first temperature, the second reflector being positioned so that the image of the second bottom in the second spectral band by the switching optic in the first position is situated on the detector.
- the first flux has a first instantaneous flow rate, the second flux has a second instantaneous flow rate strictly less than the first flow rate, the imager comprising a filter reducing the instantaneous flow rate of the first flux, the detector having a first accumulation time of the first flux and a second accumulation time of the second flux, the ratio between the first accumulation time and the second accumulation time being greater than or equal to 0.5 and less than or equal to 1.5.
- the or each reflector is a Narcissus-effect mirror
- the imager further comprises:
    - a first optical path able to transport the first flux between the separator and the switching optic,
    - a second optical path able to transport the second flux between the separator and the switching optic,
    - each optical path comprises at least one element chosen from the group made up of: an optical lens, a mirror, a prism, a separating blade and a magnifying optic able to apply a magnification coefficient to the flux transported by said optical path.
- the separator is a dichroic filter.
- at least one of the following properties is verified:
    - the first spectral band comprises wavelengths of between 8 micrometers and 12 micrometers,
    - the first spectral band comprises wavelengths of between 3 micrometers and 5 micrometers,
    - the second spectral band comprises wavelengths of between 1 micrometers and 2 micrometers, and
    - the second spectral band comprises wavelengths of between 3 micrometers and 5 micrometers.

The invention also relates to an optronic system comprising an imager as previously disclosed.

The invention also relates to a platform comprising an optronic system as previously disclosed.

Figure 2:
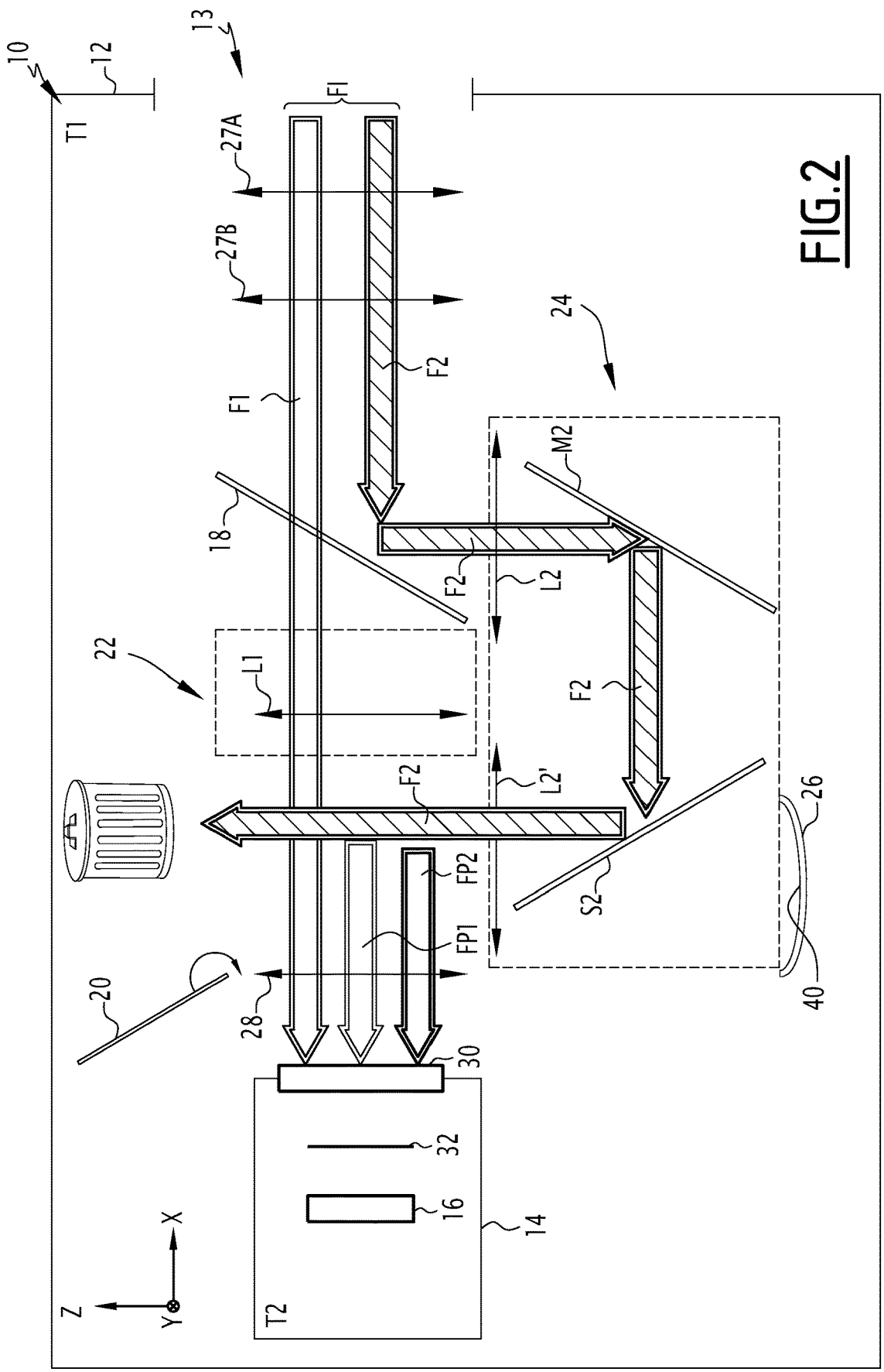
Figure 3:
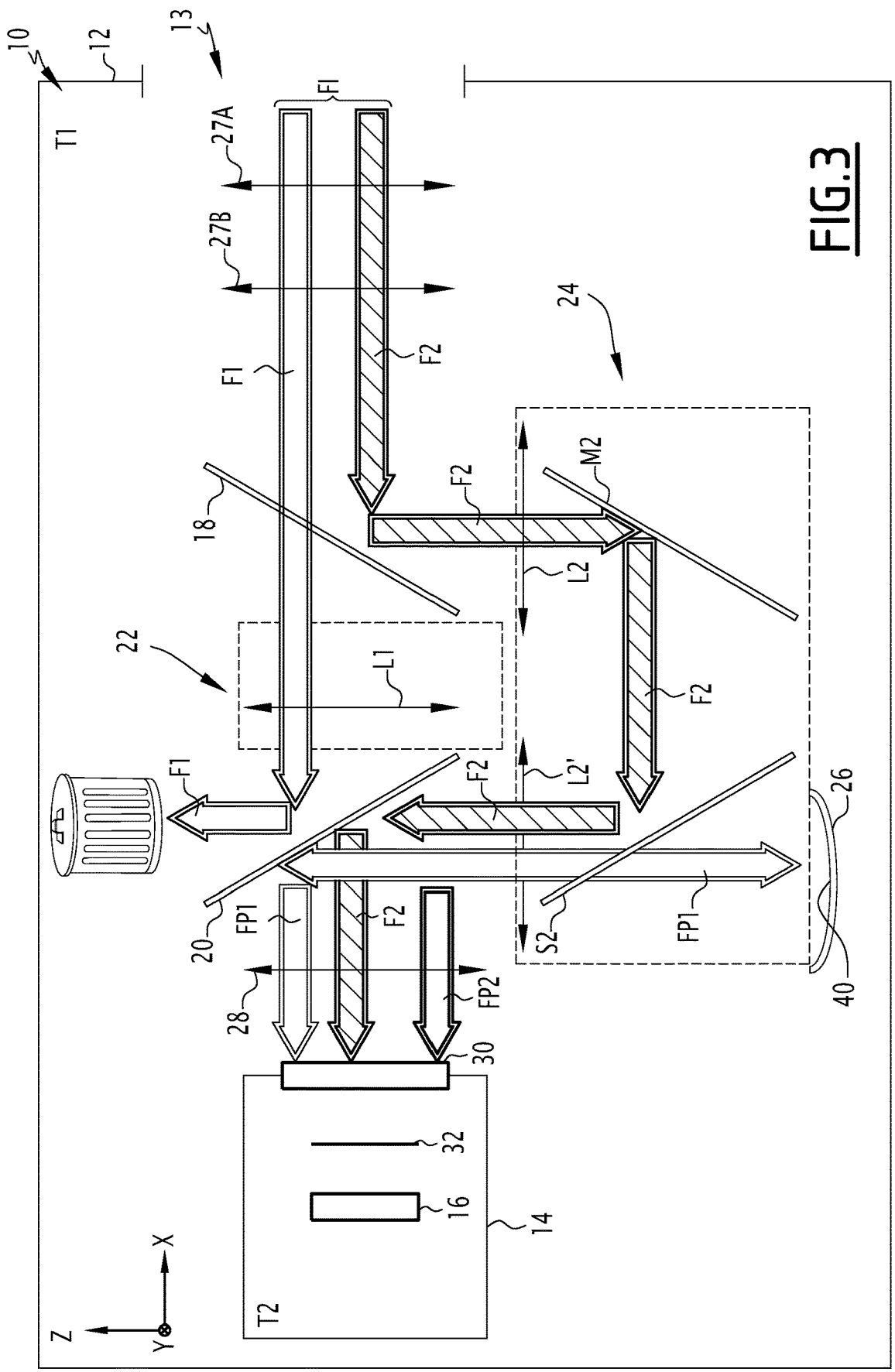
Figure 4:
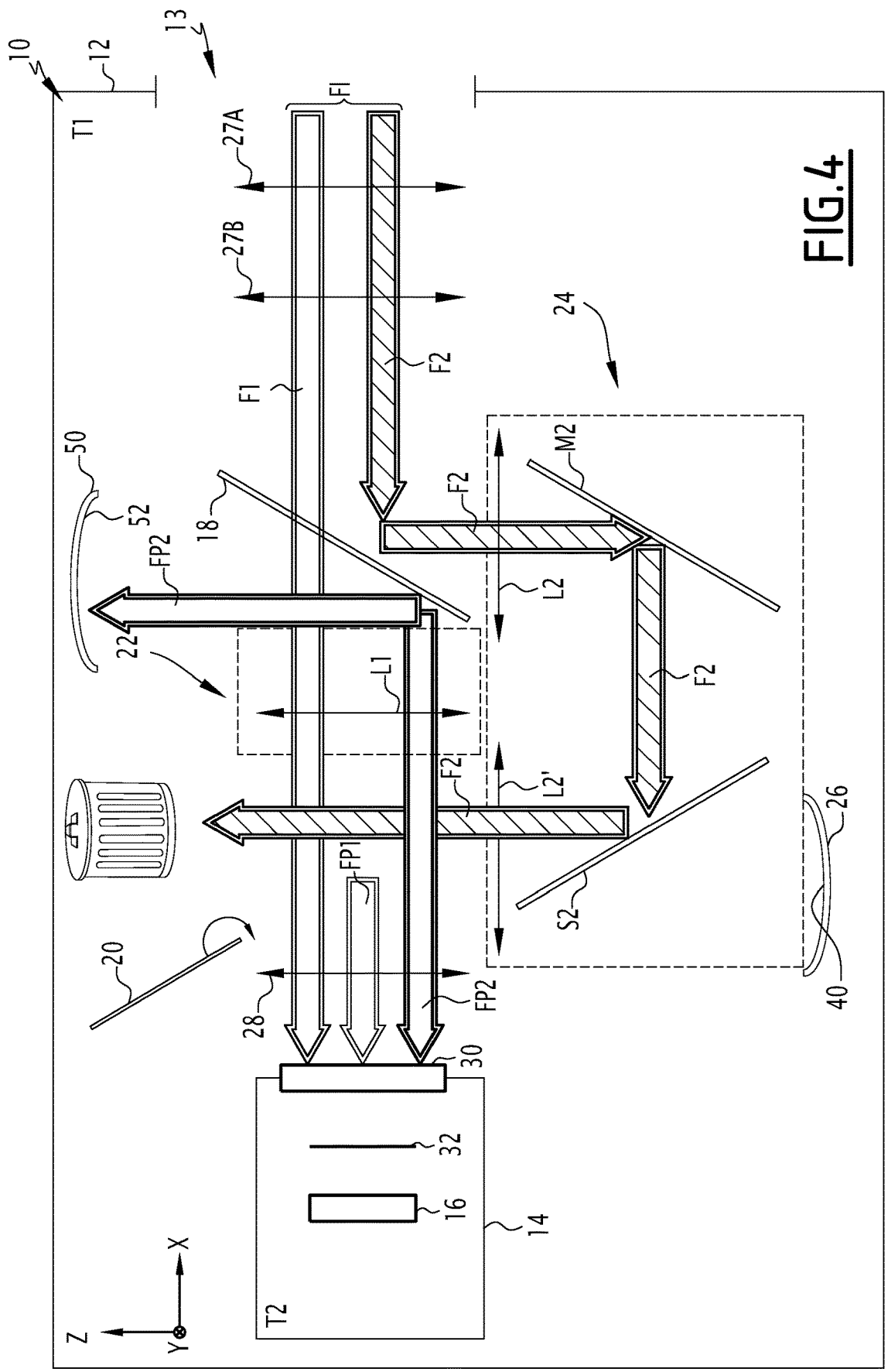
Figure 5:
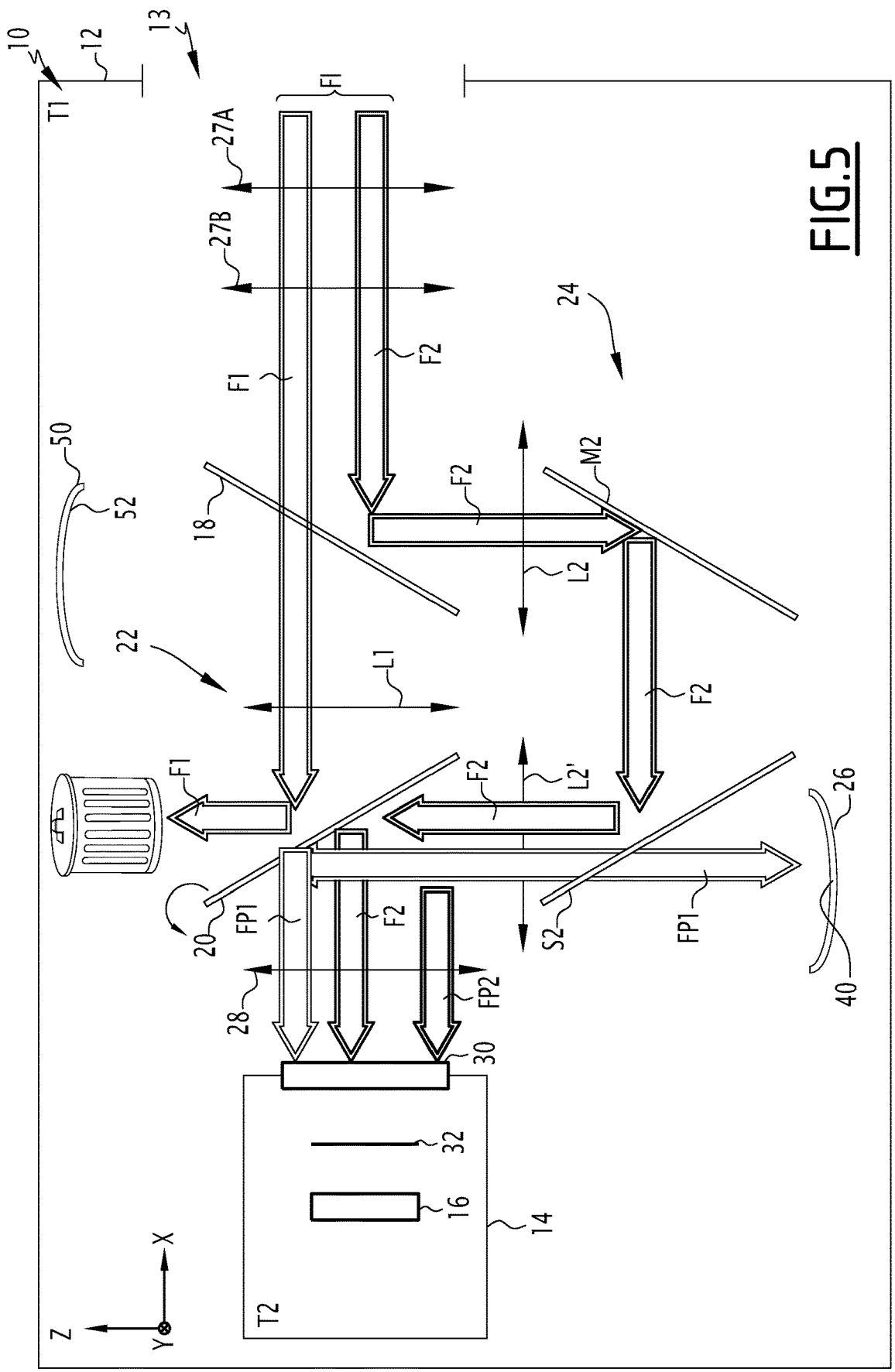
Figure 6:
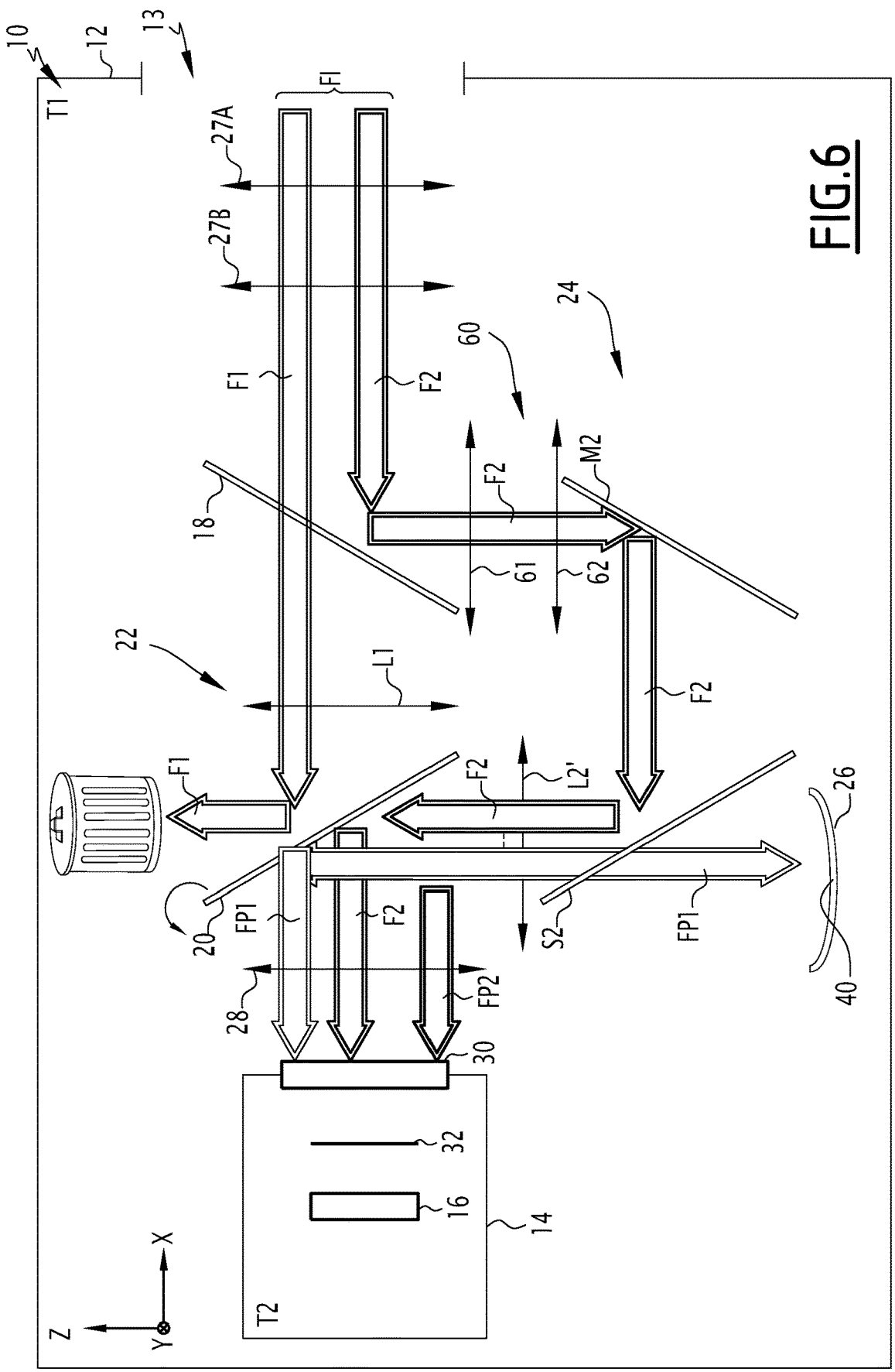

Other features and advantages of the invention will appear upon reading the following description of embodiments of the invention, solely as an example and done in reference to the drawings, which are:

FIG. 1, a schematic illustration of an example of an infrared imager according to a first embodiment of the invention, the imager comprising a switching optic, FIG. 2 is a schematic illustration of the infrared imager of FIG. 1 during operation, the switching optic of the imager being in a first position, FIG. 3 is a schematic illustration of the infrared imager of FIG. 1 during operation, the switching optic of the imager being in a second position, FIG. 4, a schematic illustration of an example of an infrared imager according to a second embodiment of the invention, the imager comprising a switching optic, the imager being shown during operation with the switching optic in a first position, FIG. 5 is a schematic illustration of the infrared imager of FIG. 4, the imager being shown during operation with the switching optic in a second position, and FIG. 6, a schematic illustration of an example of an infrared imager according to a third embodiment of the invention, the imager comprising a switching optic, the imager being shown during operation with the switching optic in a second position, An infrared imager 10 is illustrated in FIG. 1.

The infrared imager 10 is for example configured to be integrated into an optronic system. Such an optronic system is, for example, a laser designation system. The optronic system is for example itself configured to be integrated into a platform, such as the platform of an aircraft.

The infrared imager 10 is able to detect an infrared flux in at least a first spectral band B1 and a second spectral band B2. The first spectral band B1 and the second spectral band B2 are continuous and noncontiguous with respect to one another. A spectral band is said to be "continuous" when said band contains all of the wavelength values present in the interval delimited by the extreme bounds of said band.

For example, the first band B1 comprises the wavelength range between 8 μm and 12 μm (which is also called band III), and the second band B2 comprises the wavelength range between 3 μm and 5 μm (which is also called band II). In a variant, the first band B1 comprises the wavelength range between 8 μm and 12 μm, and the second band B2 comprises the wavelength range between 1 μm and 2 μm (which is also called band I). Also in a variant, the first band B1 comprises the wavelength range between 3 μm and 5 μm, and the second band B2 comprises the wavelength range between 1 μm and 2 μm.

In a variant, the spectral bands contain only one of the preceding wavelength ranges.

According to still another variant, the spectral bands are strictly included in one of the preceding wavelength ranges.

The imager 10 comprises an enclosure 12.

In the remainder of the description, a longitudinal direction X is defined shown in the figure by an axis X and corresponding to the length of the enclosure 12. A first transverse direction is further defined, called elevation direction Z, perpendicular to the longitudinal direction X and shown in the figure by an axis Z. Also defined is a second transverse direction Y, perpendicular to the longitudinal direction X and the first transverse direction Z. The second transverse direction Y is shown in the figure by an axis Y.

The dimensions of the enclosure 12 are for example between 10 centimeters (cm) and 20 cm in the longitudinal direction X, between 5 cm and 15 cm in the first transverse direction Z, and between 5 cm and 15 cm in the second transverse direction Y.

The enclosure 12 has a first temperature T1. The first temperature T1 is for example between 28° C. and 32° C.

As shown in FIG. 1, the enclosure 12 has an opening 13 for the passage of an incident light flux FI coming from the outside of the enclosure 12.

In a first embodiment illustrated in FIG. 1, the enclosure 12 comprises a cryostat 14, a detector 16, separator 18, a switching optic 20, a first optical path 22, a second optical path 24 and a first reflector 26. Furthermore, in the embodiment illustrated in FIG. 1, the imager 10 comprises two transport optics 27A, 27B and a focusing optic 28.

In a variant, the enclosure 10 comprises a single transport optic 27A, 27B or more than two transport optics 27A, 27B. Also in a variant, the enclosure 12 comprises at least two focusing optics 28.

The cryostat 14 is a closed, thermally insulated enclosure kept under vacuum. The cryostat 14 is kept at a second temperature T2. The second temperature T2 is strictly lower than the first temperature T1. The second temperature T2 is for example less than or equal to 80° K.

The cryostat 14 is equipped with a transparent window or porthole 30. The porthole 30 is able to transmit, to the inside of the cryostat 14, any infrared flux in the first or second spectral band B1, B2 arriving on the porthole 30.

The detector 16 is the only detector of the imager 10.

The detector 16 comprises a single sensor able to detect an infrared flux in the first and the second spectral band B1, B2.

The detector 16 is for example a detector made from Mercury Cadmium Telluride (MCT), called "MCT detector". Such a MCT detector is in particular suitable for detecting spectral bands I, II and III.

In a variant, the detector 16 is made from Indium-Gallium Arsenide (InGaAs).

Also in a variant, the detector 16 is made from Indium Antimonide (InSb).

The detector 16 is arranged inside the cryostat 14 so as to be kept cooled to the second temperature T2. Furthermore, the detector 16 is positioned across from the porthole 30 of the cryostat 14 so as to receive any infrared flux transmitted by the porthole 30.

In the embodiment illustrated in FIG. 1, the detector 16 is equipped with a cold filter 32 able to select an analysis spectral band. "Cold filter" refers to a filter that has been cooled to a low temperature. "Low temperature" refers to a temperature of less than or equal to 150° K.

In the context of the invention, the spectral analysis band selected by the cold filter 32 comprises at least the first and the second spectral band B1, B2.

The separator 18 is able to separate an incident infrared flux FI into two separate fluxes: a first flux F1 and a second flux F2. The first flux F1 is the portion of the incident infrared flux FI in the first spectral band B1. The second flux F2 is the portion of the incident infrared flux FI in the second spectral band B2. The incident infrared flux FI is an infrared flux coming from the outside of the enclosure 12 and arriving on the enclosure 12 via the inlet 13.

The first flux F1 has a first instantaneous flow rate and the second flux F2 has a second instantaneous flow rate. "Instantaneous flow rate" refers to the number of photons per second. The second instantaneous flow rate is strictly less than the first flow rate.

The detector 16 has a first accumulation time (also called integration time) of the first flux F1 and a second accumulation time of the second flux F2.

Advantageously, the cold filter 32 of the detector 16 has a spectral analysis band for which the instantaneous flow rate of the first flux F1 is reduced. The ratio between the first accumulation time and the second accumulation time is preferably greater than or equal to 0.5 and is less than or equal to 1.5.

The separator 18 is for example able to transmit the first flux F1 and to reflect the second flux F2, or vice versa. In the embodiment illustrated in FIG. 1, the separator 18 is able to transmit the first flux F1 and to reflect the second flux F2.

The separator 18 is, for example, a dichroic blade, also called separator blade.

The switching optic 20 is movable between a first position, illustrated in FIG. 2, in which the first flux F1 is sent to the detector 16 and a second position, illustrated in FIG. 3, in which the second flux F2 is sent to the detector 16. In the first position, the second flux F2 is not sent to the detector 16, and in the second position, the first flux F1 is not sent to the detector 16.

More specifically, in the first position, the switching optic 20 is not present on the optical path of the first flux F1 and the second flux F2. Conversely, in the second position, the switching optic 20 is present on the optical path of each of the first flux F1 and the second flux F2. Thus, in the second position, the switching optic 20 is able to reflect the first flux F1 and the second flux F2.

The switching optic 20 is for example a switching mirror.

The first optical path 22 is able to transport the first flux F1 between the separator 18 and the switching optic 20.

The first optical path 22 comprises at least one element chosen from the group made up of: an optical lens, a mirror, a prism, a separating blade and a magnifying optic able to apply a magnification coefficient to the flux transported by said optical path.

In the embodiment illustrated in FIG. 1, the first optical path 22 is delimited by a zone in dotted lines. The first optical path of FIG. 1 comprises a converging lens L1.

The second optical path 24 is able to transport the second flux F2 between the separator 18 and the switching optic 20.

The second optical path 24 comprises at least one element chosen from the group made up of: an optical lens, a mirror, a prism, a separating blade and a magnifying optic able to apply a magnification coefficient to the flux transported by said optical path.

In the embodiment illustrated in FIG. 1, the second optical path 24 is delimited by a zone in dotted lines. The second optical path 24 of FIG. 1 comprises, in the direction of propagation of the light, from upstream to downstream: a converging lens L2, a mirror M2, a separator blade S2 and another convergent lens L2'. The separator blade S2 is able to reflect the fluxes belonging to the second spectral band B2 and to transmit the fluxes belonging to the first spectral band B1.

The first reflector 26 has a first bottom 40 at a temperature strictly below the first temperature T1.

The first reflector 26 is positioned so that the image of the first bottom 40 in the first spectral band B1 by the switching optic 20 in the second position is situated on the detector 16. More specifically, the first reflector 26 is positioned so as to receive any flux in the first spectral band B1 transmitted by the separator blade S2 of the second optical path 24 and to return said flux toward the detector 16. This amounts to returning its own image back to the detector 16 in the first spectral band B1. The detector 16 being cooled in the cryostat 14, the first reflector 26 is an element seen as cold by the detector 16.

The first reflector 26 is, for example, a Narcissus effect mirror.

In a variant, the first reflector 26 is a low-temperature black body. The temperature of such a black body is typically less than or equal to 250° K.

The transport optics 27A, 27B are positioned between the inlet 13 of the enclosure 12 and the separator 18. Each transport optic 27A, 27B is, for example, a converging lens.

The focusing optic 28 is able to focus, on the detector 16, any infrared flux in the first and the second spectral band B1, B2 downstream from the switching optic 20.

The focusing optic 28 is arranged between the switching optic 20 and the detector 16. The focusing optic 28 is for example a converging lens.

The operation of the imager 10 according to the first embodiment illustrated in FIG. 1 will now be disclosed in reference to FIGS. 2 and 3.

Initially, an incident infrared flux FI is transported from the inlet 13 to the separator 18 by the transport optics 27. The incident infrared flux FI is formed by at least a first flux F1 and a second flux F2. The first flux F1 and the second flux F2 are separate from one another. The first flux F1 is the portion of the incident infrared flux FI in the first spectral band B1. The second flux F2 is the portion of the incident infrared flux FI in the second spectral band B2.

The separator 18 transmits the first flux F1 and reflects the second flux F2.

The first optical path 22 transports the first flux F1 between the separator 18 and the switching optic 20.

The second optical path 24 transports the second flux F2 between the separator 18 and the switching optic 20. More specifically, the second flux F2 is reflected on the mirror M2, then on the separator blade S2 of the second optical path 24.

When the switching optic 20 is in the first position, illustrated in FIG. 2, the switching optic 20 is not found on the optical path of the first flux F1 and the second flux F2. The first flux F1 transmitted by the first optical path 22 is then focused by the focusing optic 28 on the detector 16. The second flux F2 transmitted by the second optical path 24 is in turn then absorbed by the walls of the enclosure 12.

Thus, when the switching optic 20 is in the first position, the detector 16 receives the first flux F1, a first stray flux FP1 in the first spectral band B1 and a second stray flux FP2 in the second spectral band B2. The first stray flux FP1 comes from the heat given off by the separator 18 and by the optics of the first optical path 22, which are at the first temperature T1 of the enclosure 12. The first stray flux FP1 differs from the first flux F1 by the fact that said first stray flux FP1 is detected by the detector 16 both in the presence and in the absence of the first flux F1. The second stray flux FP2 comes from the heat given off by the separator 18 and by the optics of the second optical path 24, which are at the first temperature T1 of the enclosure 12. The second stray flux FP2 differs from the second flux F2 by the fact that said second stray flux FP2 is detected by the detector 16 both in the presence and in the absence of the second flux F2. The first and second stray fluxes contribute, as noise to be deteriorated, the signal-to-noise ratio of the detector 16.

When the switching optic 20 is in the second position, illustrated in FIG. 3, the switching optic 20 is found on the optical path of the first flux F1 and the second flux F2. The first flux F1 transmitted by the first optical path 22 is then reflected by the switching optic 20 toward the walls of the enclosure 12 and is absorbed by the walls of the enclosure 12. The second flux F2 transmitted by the second optical path 24 is reflected by the switching optic 20 so as to be focused for the focusing optic 28 on the detector 16.

When the switching optic 20 is in the second position, the detector 16 then receives the second flux F2, a first stray flux FP1 in the first spectral band B1 and a second stray flux FP2 in the second spectral band B2.

However, the first stray flux FP1 is a flux seen by the detector 16 as being cooled to the second temperature T2 imposed by the cryostat 14. Indeed, the first stray flux FP1 is transmitted by the separator blade S2 from the second optical path 24 to the first reflector 26, and is reflected by the first reflector 26 in the opposite direction through the separator blade S2 toward the detector 16. The first reflector 26 being positioned so that the image of the first bottom 40 by the switching optic 20 in the second position is situated on the detector 16, the first stray flux FP1 is seen by the detector 16 as being at the temperature of the detector 16, that is to say, at a second temperature T2. Thus, the image of the detector 16 by the first stray flux FP1 is superimposed on the useful image from the second flux F2.

The imager 10 therefore makes it possible to separate, via the separator 18, two fluxes F1, F2 coming from a same incident infrared flux FI, to process them separately in the first and second optical path 22, 24, then to recombine them on the detector 16 using the switching optic 20. Such an imager 10 also makes it possible to process, separately from the first and second fluxes F1, F2, the stray noises generated by said fluxes F1, F2 in the imager 10.

Thus, the imager 10 according to the first embodiment makes it possible to detect two continuous and noncontiguous spectral bands B1, B2 from a single detector 16 covering the two spectral bands B1, B2, of a switching optic 20 and a separator 18 making it possible to select the desired spectral band.

When the switching optic 20 is in the second position, the first reflector 26 associated with the separator blade S2 makes it possible to make the noise generated by the photons of the unused band (first spectral band B1) negligible in order to obtain an imager 10 able to operate in each of the two bands while having performances equivalent to imagers specific to each of the first and the second spectral band B1, B2.

The imager 10 also consumes fewer resources and is less bulky than the imagers of the state of the art, since a single detector 16 is used to produce the imager 10.

According to a second embodiment as shown in FIGS. 4 and 5, the elements identical to the imager 10 according to the first embodiment disclosed in light of FIGS. 1 to 3 are not repeated. Only the differences are shown.

The imager 10 further comprises a second reflector 50 having a second bottom 52 at a temperature lower than the first temperature T1.

The second reflector 50 is positioned so that the image of the second bottom 52 in the second spectral band B2 by the switching optic 20 in the first position is situated on the detector 16. More specifically, the second reflector 50 is positioned so as to receive any flux in the second spectral band B2 reflected by the separator 18 and to return said flux toward the detector 16. This amounts to returning its own image back to the detector 16 in the second spectral band B2. The detector 16 being cooled in the cryostat 14, the second reflector 50 is an element seen as cold by the detector 16.

The second reflector 50 is, for example, a Narcissus effect mirror.

In a variant, the second reflector 50 is a low-temperature black body. The temperature of such a black body is typically less than or equal to 250° K.

Hereinafter, only the operating differences in the imager 10 according to the second embodiment relative to the first embodiment are shown. The identical steps are not repeated.

When the switching optic 20 is in the first position, the detector 16 receives the first flux F1, a first stray flux FP1 in the first spectral band B1 and a second stray flux FP2 in the second spectral band B2.

However, the second stray flux FP2 is a flux seen by the detector 16 as being cooled to the second temperature T2 imposed by the cryostat 14. Indeed, the second stray flux FP2 is reflected by the separator 18 toward the second reflector 50, and is reflected by the second stray reflector 50 in the opposite direction through the separator 18 toward the detector 16. The second reflector 50 being positioned so that the image of the second bottom 52 by the switching optic 20 in the first position is situated on the detector 16, the second stray flux FP2 is seen by the detector 16 as being at the temperature of the detector 16, that is to say, at the second temperature T2. Thus, the image of the detector 16 by the second stray flux FP2 is superimposed on the useful image from the first flux F1.

Thus, aside from the advantages of the first embodiment, the imager 10 according to the second embodiment makes it possible, when the switching optic 20 is in the first position, to make the noise generated by the photons of the unused band (second spectral band B2) negligible in order to obtain an imager 10 able to operate in each of the two bands while having performances equivalent to imagers specific to each of the first and the second spectral band B1, B2. The second embodiment therefore makes it possible to further reduce the stray noises.

Such an imager 10 is in particular advantageous when the ratio between the first and second accumulation times is greater than or equal to 0.5 and is less than or equal to 1.5. Indeed, in this case, when the switching optic 20 is in the first position, the second stray noise FP2 is still not negligible. The second reflector 50 associated with the separator 18 then makes it possible to cool, for the detector 16, the second noise FP2 and therefore to make it negligible for the detector 16.

According to a third embodiment as shown in FIG. 6, the elements identical to the imager 10 according to the first embodiment disclosed in light of FIGS. 1 to 3 are not repeated. Only the differences are shown.

In the third embodiment, the second optical path 24 comprises a magnification assembly 60 in place of the converging lens L2. The magnification assembly 60 is able to apply a magnification coefficient to the second flux F2 transported by the second optical path 24. The magnification coefficient is for example equal to 4. In the example shown in FIG. 6, the magnification assembly 60 comprises two converging lenses 61, 62.

Hereinafter, only the operating differences in the imager 10 according to the third embodiment relative to the first embodiment are shown. The identical steps are not repeated.

During the passage of the second flux F2 in the second optical path 24, a magnification coefficient is applied on said second flux F2.

This makes it possible to obtain an enlarged image on the detector 16 from the second flux F2.

In a variant, the magnification assembly 60 or another magnification assembly is integrated into the first optical path 22.

In still another variant, the imager 10 comprises the elements of the third embodiment, as well as the second reflector 50 of the second embodiment.

In an optional addition of each of the preceding embodiments, the enclosure 12 comprises collectors, also called "light traps". The collectors are able to collect the fluxes sent toward the walls of the enclosure 12 so as to avoid generating stray reflections in the enclosure 12.

The invention claimed is:

1. An infrared imager suitable for detecting an infrared flux in a first spectral band and a second spectral band, the first spectral band and the second spectral band being continuous and noncontiguous with one another, the infrared imager comprising an enclosure, the enclosure having a first temperature, the enclosure comprising:
   a separator separating an incident infrared flux into a first flux and a second flux separate from the first flux, the first flux being a portion of the incident infrared flux in the first spectral band and the second flux being a portion of the incident infrared flux in the second spectral band,
   a single detector able to detect a flux in both the first spectral band and the second spectral band, the detector being cooled to a second temperature, the second temperature being strictly lower than the first temperature, a switching optic movable between a first position and a second position, wherein in the first position the first flux is sent to the detector and the second flux is blocked from the detector, and in the second position the second flux is sent to the detector and the first flux is blocked from the detector, and a first reflector having a first bottom at a first reflector temperature strictly below the first temperature, the first reflector being positioned so that an image of the first bottom in the first spectral band by the switching optic in the second position is situated on the detector.

2. The infrared imager according to claim 1, wherein the detector is made from a material chosen from among Mercury Cadmium Telluride, Indium-Gallium Arsenide and Indium Antimonide.

3. The infrared imager according to claim 1, further comprising:

a second reflector having a second bottom at a second reflector temperature strictly below the first temperature, the second reflector being positioned so that an image of the second bottom in the second spectral band by the switching optic in the first position is situated on the detector.

4. The infrared imager according to claim 3, wherein one or both of the first reflector or the second reflector is a Narcissus effect mirror.

5. The infrared imager according to claim 1, wherein the first flux has a first instantaneous flow rate, the second flux has a second instantaneous flow rate strictly less than the first instantaneous flow rate, the infrared imager further comprises a filter reducing the first instantaneous flow rate of the first flux, the detector has a first accumulation time of the first flux and a second accumulation time of the second flux, and a ratio between the first accumulation time and the second accumulation time is greater than or equal to 0.5 and less than or equal to 1.5.

6. The infrared imager according to claim 1, wherein the first reflector is a Narcissus effect mirror.

7. The infrared imager according to claim 1, further comprising:

a first optical path able to transport the first flux between the separator and the switching optic, and a second optical path able to transport the second flux between the separator and the switching optic, wherein each of the first optical path and the second optical path comprises at least one element chosen from the group made up of: an optical lens, a mirror, a prism, a separating blade, and a magnifying optic able to apply a magnification coefficient to the first flux transported by said first optical path or the second flux transported by said second optical path.

8. The infrared imager according to claim 1, wherein the separator is a dichroic blade.

9. The infrared imager according to claim 1, wherein at least one of the following properties is verified:

the first spectral band comprises wavelengths of between 8 micrometers and 12 micrometers, the first spectral band comprises wavelengths of between 3 micrometers and 5 micrometers, the second spectral band comprises wavelengths of between 1 micrometer and 2 micrometers, or the second spectral band comprises wavelengths of between 3 micrometers and 5 micrometers.

10. An optronic system comprising the infrared imager according to claim 1.

11. A platform comprising the optronic system according to claim 10.

* * * * *